US005838889A

United States Patent [19]
Booker

[11] Patent Number: 5,838,889
[45] Date of Patent: Nov. 17, 1998

[54] METHOD AND APPARATUS FOR FLIPPING A DOUBLE-SIDED GRAPHIC IMAGE HAVING DIFFERENT SIZED FIRST AND SECOND SIDES

[75] Inventor: Susan L. Booker, San Carlos, Calif.

[73] Assignee: Apple Computer, Inc., Cupertino, Calif.

[21] Appl. No.: 444,190

[22] Filed: May 18, 1995

Related U.S. Application Data

[60] Continuation of Ser. No. 257,560, Jun. 10, 1994, abandoned, which is a division of Ser. No. 831,256, Jan. 29, 1992, Pat. No. 5,351,995.

[51] Int. Cl.$^6$ ............................................. G06T 3/40
[52] U.S. Cl. ................................... 395/118; 395/349
[58] Field of Search ................................. 395/118, 145, 395/155, 352–358, 127–8, 337, 349, 139

[56] References Cited

U.S. PATENT DOCUMENTS

| | | | |
|---|---|---|---|
| 4,601,003 | 7/1986 | Yoneyama et al. | 395/351 |
| 4,645,238 | 2/1987 | Vincent et al. | 283/67 |
| 4,685,070 | 8/1987 | Flinchbaugh | 395/190 |
| 4,813,013 | 3/1989 | Dunn | 395/333 |
| 4,860,217 | 8/1989 | Sasaki et al. | 364/518 |
| 4,866,638 | 9/1989 | Cosentino et al. | 364/146 |
| 4,899,136 | 2/1990 | Beard et al. | 345/156 |
| 4,901,221 | 2/1990 | Kodosky et al. | 395/348 |
| 4,905,163 | 2/1990 | Garber et al. | 395/63 |
| 4,914,568 | 4/1990 | Kodosky et al. | 364/221.2 |
| 5,019,809 | 5/1991 | Chen | 340/815.42 |
| 5,053,762 | 10/1991 | Sarra | 340/734 |
| 5,072,412 | 12/1991 | Henderson et al. | 395/346 |
| 5,146,555 | 9/1992 | Kiyohara | 395/157 |
| 5,233,332 | 8/1993 | Watanabe et al. | 340/724 |
| 5,283,864 | 2/1994 | Knowlton | 395/158 |
| 5,303,388 | 4/1994 | Kreitman et al. | 395/159 |
| 5,333,255 | 7/1994 | Damouth | 395/157 |

OTHER PUBLICATIONS

Tyson R. Henry and Scott E. Hudson, "*Multidimensional Icons*", The Interaction Technique Notebook, 1990, pp. 133–137.

Brennan, Laura, "Microtecture Boosts CAD Software With Database, 3–D Programs", *PC Week*, vol. 5, No. 24, (Jun. 14, 1988) p. 30 (2 pgs.) (Reprint provided by Information Access Company).

Chen, Micheal, S. Joy Mountford and Abigail Sellen, "A Study in Interactive 3–D Rotation Using 2–D Control Devices", *ACM Computer Graphics*, vol. 22, No. 4, (Aug. 1988), pp. 121–129.

Custer, Linda, "Stacking the Deck", *MacUser*, vol. 3, No. 12, (Dec. 1987), pp. 112–120 (Reprint from Computer Library Periodicals, Jan. 1989 enclosed)(7 pgs.).

Henry, Tyson R. and Scott E. Hudson, "Multidimensional Icons", *ACM Transactions on Graphics*, vol. 9, No. 1, (Jan. 1990), pp. 133–137.

(List continued on next page.)

*Primary Examiner*—Joseph H. Feild
*Assistant Examiner*—Randolph J Buchel
*Attorney, Agent, or Firm*—Blakely, Sokoloff, Taylor & Zafman

[57] ABSTRACT

Electronic paper which has two sides, reverse of one another, which can be flipped over in response to user generated flip commands is described. When a piece of electronic paper is flipped over, a number of transition views of the paper are generated to give the user the impression that the paper is actually being turned over to reveal a reverse side. Different information can be stored on either side, and the composition of either side can be linked so that changes made to the graphic information on one side affects the graphic information on the other side. In addition, when the amount of graphic information on the reverse side of the paper exceeds the amount of available space normally available on the reverse side when the paper is flipped over, approximately the same amount of space available on the top side, the reverse side is expanded to fit the quantity of information to be displayed on the reverse side. If the reverse side has been expanded, and the user instructs the page to flip back to the top side, the reverse side shrinks back to its original size and then flips back to the top side.

22 Claims, 8 Drawing Sheets

OTHER PUBLICATIONS

Ichikawa, Tadao and Masahito Hirakawa, "Visual Programming—Toward Realization of User–Friendly Programming Environments," *ACM 1987 Fall Computer Conference: Exploring Technology: Today and Tomorrow*, Oct. 25–29, 1987, Computer Society Press of the IEEE, pp. 129–137.

Nielson, Gregory M. and Dan R. Olson Jr., "Direct Manipulation Techniques for 3D Objects Using 2D Locator Devices", Workshop on Interactive 3D Graphics , Oct. 23–24, 1986, pp. 175–182.

Sutherland, Ivan E., "Three–Dimensional Data Input by Table", *Proceedings of the IEEE*, (Apr. 1974), pp. 266–274.

Wesley, Michael, "A Guide to Guide", *MacUser*, vol. 4, No. 1, (Jan. 1988), pp. 126–131 (Reprint from Computer Library Periodicals, Jan. 1989 enclosed)(6 pgs.).

Apple Computer Inc., *Hypercard User's Guide*, (1988), pp. 1–161 and 185–195.

"Mail–Waiting Icon for PC–Based Office System", *IBM Technical Disclosure Bulletin*, vol. 32, No. 6B, (Nov. 1989), pp. 173–174.

FIG_1

FIG_2A

FIG_2B

FIG_3A

FIG_3B

FIG_4A

METHOD AND APPARATUS FOR FLIPPING A DOUBLE-SIDED GRAPHIC IMAGE HAVING DIFFERENT SIZED FIRST AND SECOND SIDES

This is a continuation of application Ser. No. 08/257,560, filed Jun. 10, 1994 now abandoned, which is a divisional of application Ser. No. 07/831,256 filed Jan. 29, 1992, now U.S. Pat. No. 5,351,995.

FIELD OF THE INVENTION

The present invention relates generally to electronic objects for displaying text and graphics on the screen of a computer, and more particularly to electronic paper which can be flipped from a top side to a reverse bottom side within the same general visual area of a display and which can be independently edited through use of a graphical user interface.

BRIEF DESCRIPTION OF THE PRIOR ART

There are many different software programs which allow various images to be displayed on the screen of a computer. In computer systems having graphical user interfaces, these images include icons, dialog boxes, tool boxes and windows, which include a wide variety of different types of information, such as text pages, spreadsheets and graphics. Many graphical user interfaces are window based systems. Window based systems provide the user with a background screen, often referred to as a desktop, upon which a number of different windows, two-dimensional boxlike images, can be placed. Each window has the ability to display a certain type of information to a user. One window may represent a disk drive, and display a group of icons representing the different files of information stored within the disk drive. Other windows may represent pages of text created through operation of a word processing program, or pages of graphics created through operation of a drawing program. Other types of graphical user interfaces may use other types of images to represent information to a user, such as loose pages or notebook pages for entering text or drawing graphics.

Regardless of the manner of presentation (i.e., a window or nonwindow-based system), there is a certain class of graphic objects created by any graphical user interface which can be referred to as electronic paper. Electronic paper, as defined and used herein, is intended to mean a type of graphic object which presents a user with an electronically generated image intended to take the place of a physical piece of paper or like substance in the environment of the computerized system in which it is utilized. Hence, a page created by a word processing program can represent a typical page of writing paper, a page created by a drawing program can represent a page of drafting paper, a page created by a spreadsheet program can represent a page of accounting paper, a dialog box or a tool box can represent a form which a user might fill in to get certain work performed, an image can represent a photograph, etc.

Even though electronic paper only resides on a computerized system instead of practically anywhere (like real paper), and users must typically use a keyboard and mouse to work with electronic paper instead of pens and pencils, users are comfortable with electronic paper because the medium it provides still resembles the real medium with which they are already familiar. Users would, perhaps, be even more comfortable with electronic paper were it not for one drawback, and that is, that electronic paper is only single-sided, while virtually all real paper is double-sided. Although some word processing and page layout programs allow a user to input text in a duplex page mode, so that printed pages are printed on both sides, the user still works with pages in the program as though they were single-sided. Some effort has also been extended to utilize various sides of electronic images to present information to users, such as the simulated three-dimensional icons described in T. Henry & S. Hudson, (January 1990) Multidimensional Icons, ACM Transactions on Graphics, Vol. 9, No. 1, pp. 133–137, but such icons are quite dissimilar to electronic paper. These icons do, however, have an advantage over traditional icons in that they allow for several accessible views of an object to be presented using only a fraction of the screen space normally required to display the same amount of information in more traditional forms.

BRIEF SUMMARY OF THE INVENTION

A preferred embodiment of the present invention includes a piece of electronic paper which has two sides, reverse of one another, which can be flipped over in response to user generated flip commands. When a piece of the paper is flipped over, a number of transition views of the paper are generated to give the user the impression that the paper is actually being turned over to reveal a reverse side. Different information can be stored on either side, and the composition of either side can be linked so that changes made to the graphic information on one side affects the graphic information on the other side. In addition, when the amount of graphic information on the reverse side of the paper exceeds the amount of available space normally available on the reverse side when the paper is flipped over, approximately the same amount of space available on the top side, the reverse side is expanded to fit the quantity of information to be displayed on the reverse side. If the reverse side has been expanded, and the user instructs the page to flip back to the top side, the reverse side shrinks back to its original size and then flips back to the top side.

DETAILED DESCRIPTION OF PREFERRED EMBODIMENT

The present invention has application to any type of computerized display system, such as a personal computer, a graphical display-based personal information manager, or even a photocopier with a processor controlled operating display. The present invention is most particularly well suited for implementation in a computer system 10, such as that illustrated in FIG. 1, which utilizes some form of a graphical user interface for controlling the operation of system software run by the processor 12. In the currently preferred embodiment, computer system 10 is one of the Macintosh® family of personal computers, such as the Macintosh® IIci manufactured by Apple Computer, Inc. of Cupertino, Calif.

Figure 1:
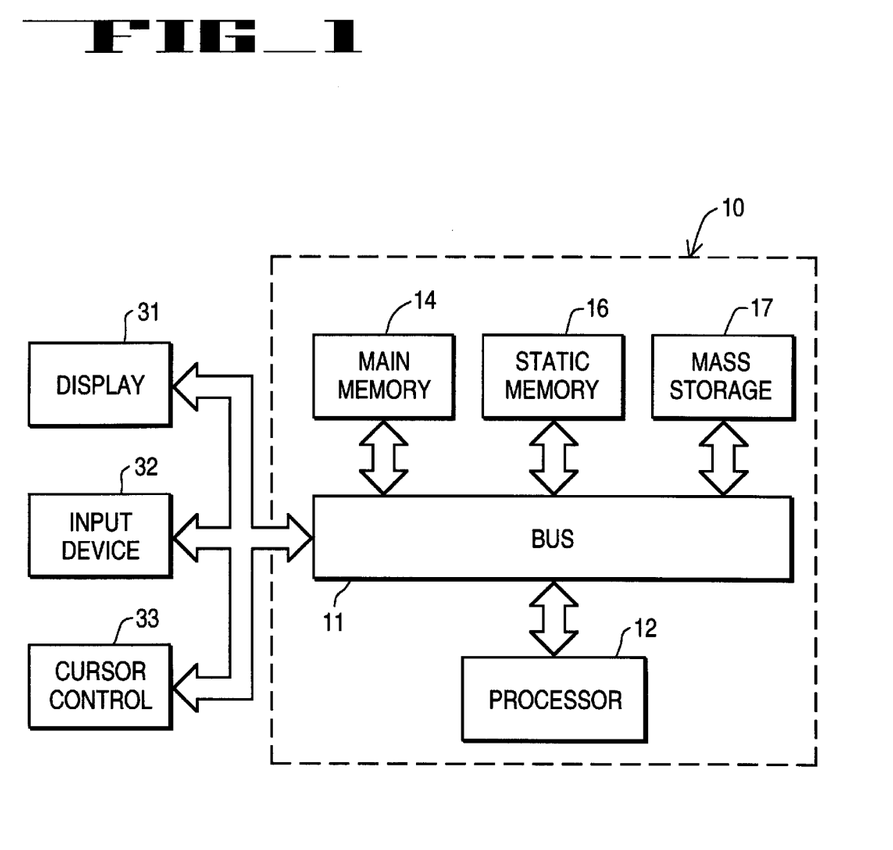
FIG. 1 is a block diagram of a computer system upon which the present invention may be implemented.

Computer system 10 comprises a bus or other communication means 11 for communicating information, and a processing means 12 coupled with bus 11 for processing information. System 10 further comprises a random access memory (RAM) or other dynamic storage device as main memory 14, coupled to bus 11 for storing information and instructions to be executed by processor 12. Main memory 14 also may be used for storing temporary variables or other intermediate information during execution of instructions by processor 12. Computer system 10 also comprises a read only memory (ROM) and/or other static storage device 16 coupled to bus 11 for storing static information and instructions for processor 12, and a data storage device 17, such as a magnetic disk or optical disk and its corresponding disk drive. Data storage device 17 is coupled to a display device 31, such as a cathode ray tube (CRT) coupled to bus 11 for displaying information to a computer user.

An alphanumeric input device 32, such as a pen/stylus or keyboard, may also be coupled to bus 11 for communicating information and command selections to processor 12. An additional user input device, for when a pen/stylus input is not utilized, is cursor control 33, such as a mouse, a trackball, or cursor direction keys. Cursor control 33 is coupled to bus 11 for communicating direction information and command selections to processor 12, and for controlling cursor movement on display 31. The graphical user interface described above is, at least in part, employed through operation of input device 32, for selecting and moving objects on the screen of display device 31, and/or cursor control 33, through its operation of a selection button.

Figure 2A:
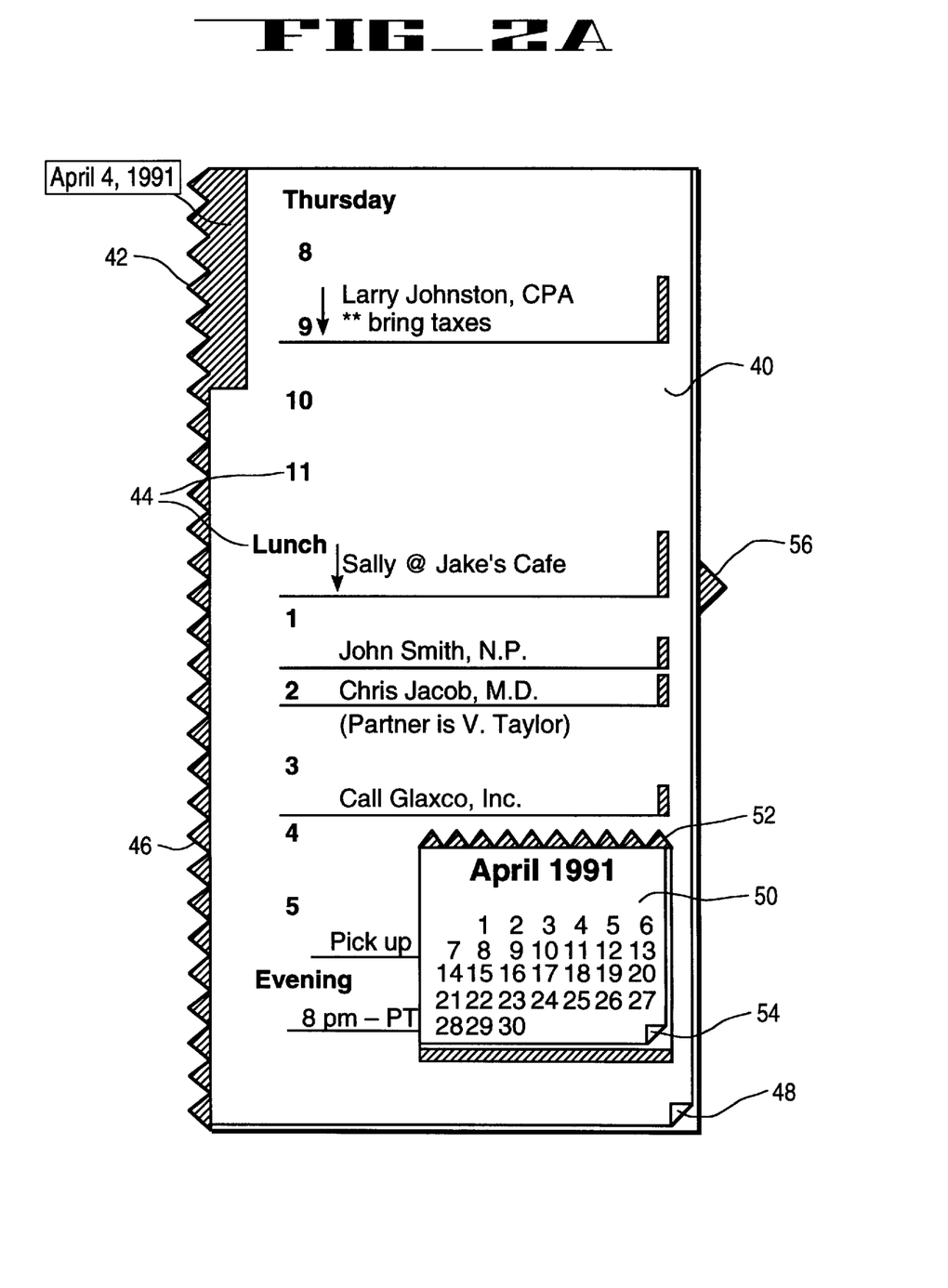
FIGS. 2a through 2c illustrate a page of an electronic calendar as it is flipped over to reveal a bottom side including user selectable preferences for modifying information displayed of the top side of the calendar and for performing other functions.

FIG. 2a illustrates a top side of a page 40 of electronic paper in the form of a calendar, which can be displayed as a page within a window of a window based interface system, or as a loose page in another type of interface system. The top of page 40 includes: a header 42; various entries 44 for indicating different times or events during a day, together with notes and appointments corresponding to those times and events; a jagged boundary 46 for indicating that page 40 represents one page in a binder or notebook; a page selector 48 for providing access to additional pages in the calendar through selection of selector 48; and a monthly calendar 50 which is overlaid on page 40. Monthly calendar 50 also includes a jagged boundary 52 for indicating that monthly calendar 50 is part of a binder, and a page selector 54 for accessing the other pages of the calendar 50.

Figure 2B:
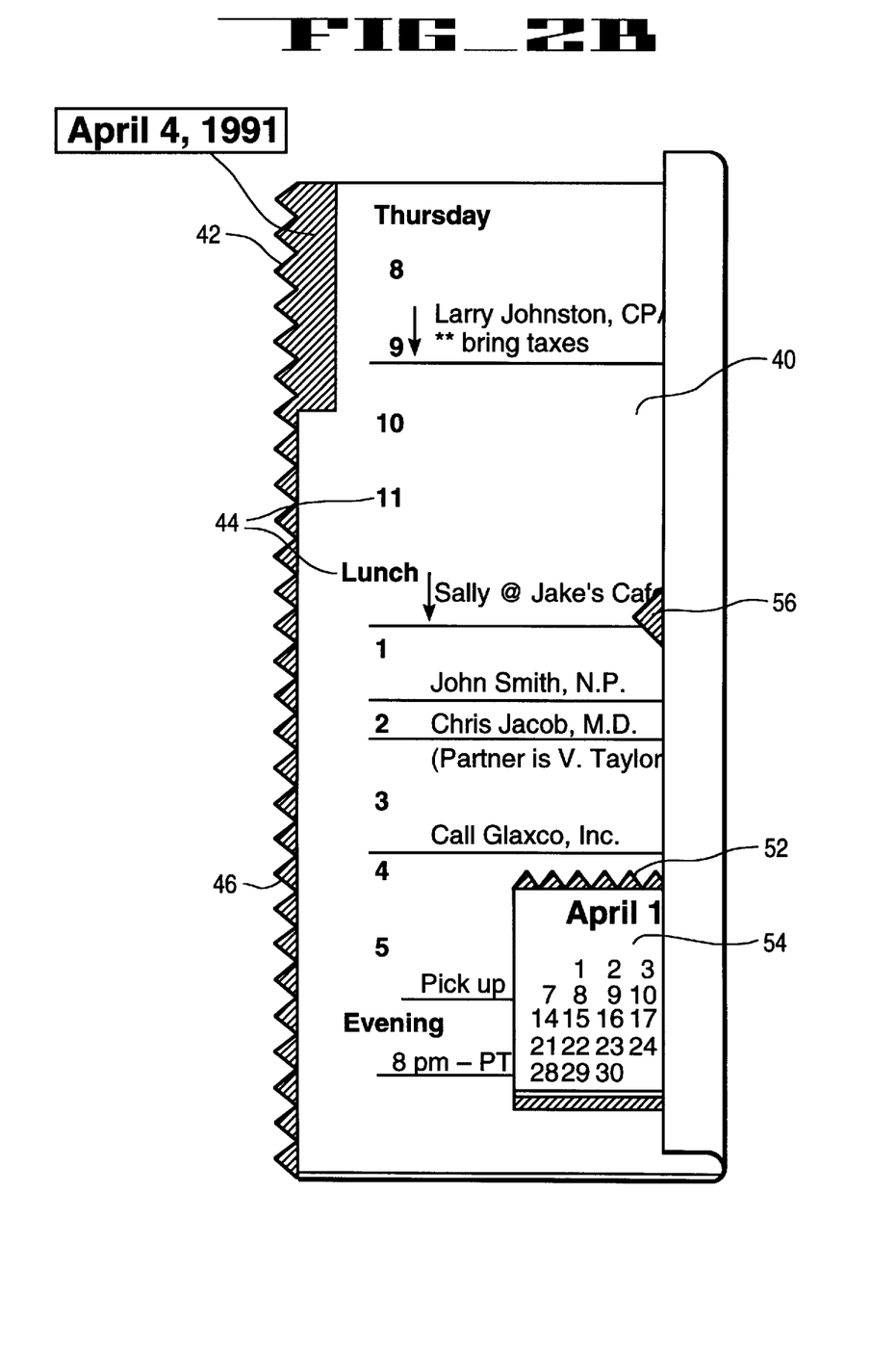
Figure 2C:
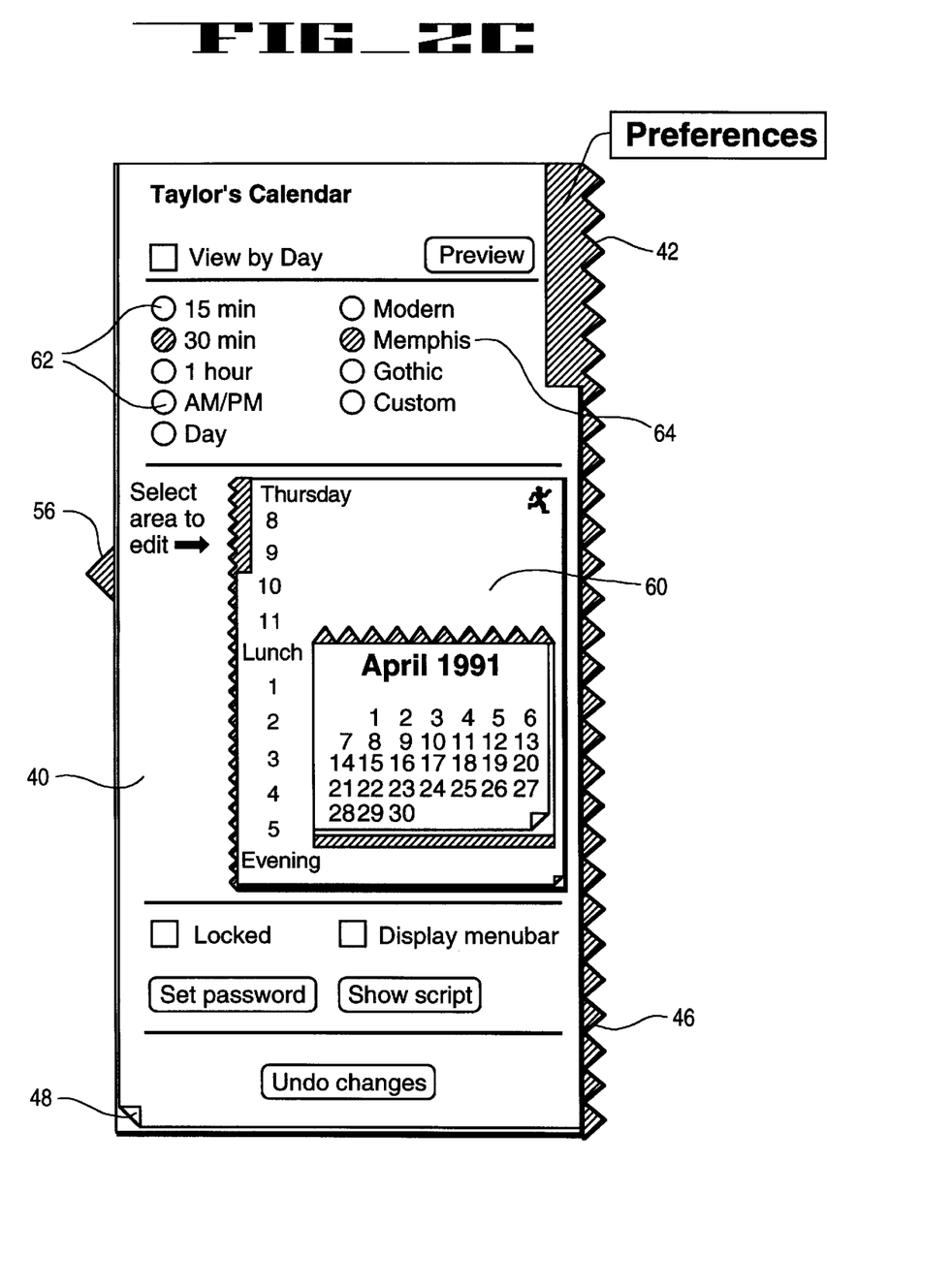

Finally, page 40 further includes a flip selecting means, such as flip selector 56, which can be selected by a user to cause page 40 to flip over and reveal a bottom side of page 40. As illustrated in FIGS. 2a–2c, this flip selecting means, flip selector 56, is an electronic button that is selected with a pen/stylus device, or by positioning a cursor over the selector means 56 and pushing a selection button of cursor control 33. Electronic buttons and their operation are well known in the art. Preferably, however, this flip selector means is a graphic gesture, such as that illustrated in FIG. 3a, which is made by the user within a prescribed area of the display and which is recognized by computer system 10 as a command for performing the operation of flipping over page 40.

When a user performs the flip gesture or activates flip selector 56, page 40 will begin to turn up on the right side as though page 40 was being flipped over, as illustrated in FIG. 2b. Note that in this preferred embodiment of the present invention, the bottom side of page 40 is left blank until page 40 has completed the selected flip operation. Once the flip operation has been completed, the contents of the bottom side of page 40 are revealed. The purpose of the flipping operation is to leave the user with the impression that the bottom side of page 40 is the opposite side or reverse side of the top side of page 40. Naturally, many different means for displaying the top side and bottom side of page 40 could be developed, aside from some means of flipping a page, to leave the appearance of the two sides being on opposite sides of the same page of electronic paper, such as fading. out the information on one page while fading in the information on the other page, etc.

With reference now to FIG. 2c, the bottom side of page 40 includes a number of preference areas with which the user can interact to affect changes to both the top side and bottom side of page 40. In fact, either side of page 40 can be used to associate controls for affecting the appearance or function of the information on either or both sides of page 40, which is another particularly useful feature of the present invention. For example, the user could make changes to the calendar image 60 on the bottom side of page 40 (calendar image 60 is a miniaturized image of page 40's top side), through operation of other controls available on the bottom side of page 40, and have those changes appear on both the top and bottom side of page 40.

To change calendar image 60, the user would use cursor control 33 to select a portion of the calendar image 60. The user would then move above calendar image 60 and select some of the options 62 available to modify the notes and appointments entered in the top side of page 40 which correspond to the selected portion of calendar image 60. For example, selecting the Memphis option 64 would cause any text in the corresponding selected area of the top side of page 40 to be displayed in the Memphis font. Other preferences could also be selected in this manner, such as locking the top side of page 40 so that it can't be modified, setting up a password to access the preferences, displaying a menu bar of additional preferences and command options, etc. Note that when the bottom side of page 40 is illustrated, the position of the header 42, the jagged boundary 46, the page selector 48, and the flip selector 56, are shown on respectively reverse sides of the page so as to clearly indicate that the bottom side of page 40 is the opposite side of the top side of page 40. To flip back to the top side of page 40 after performing any desired modifications or preference operations, the user would simply choose flip selector 56 again, and the reverse of the flip operation described above would be performed.

A second application of the present invention is depicted in FIGS. 3a through 3d, in which a piece of electronic paper in the form of a flippable dialog box 70 is illustrated. Dialog box 70, depicted in FIG. 3a, generally would appear overlaid on a text document or spreadsheet after execution of a find command of a software program running on computer system 10. By entering a word or phrase on the line 72 and selecting OK button 74, a find program would be executed which would scan the text document or spreadsheet looking for the word or phrase entered on line 72. Dialog boxes sometimes have preferences, like the preferences described above for page 70, which allow the user to modify the operation of the program executed by the dialog box 70. To display these preference, dialog box 70 would need to be flipped over, which could be achieved in either to the two previously described manners. As an alternative embodiment, the user could first choose to select the right border 76 of dialog box 70, which is an electronic button which would recognize this as a flip command and commence execution of the flip operation.

Figure 3A:
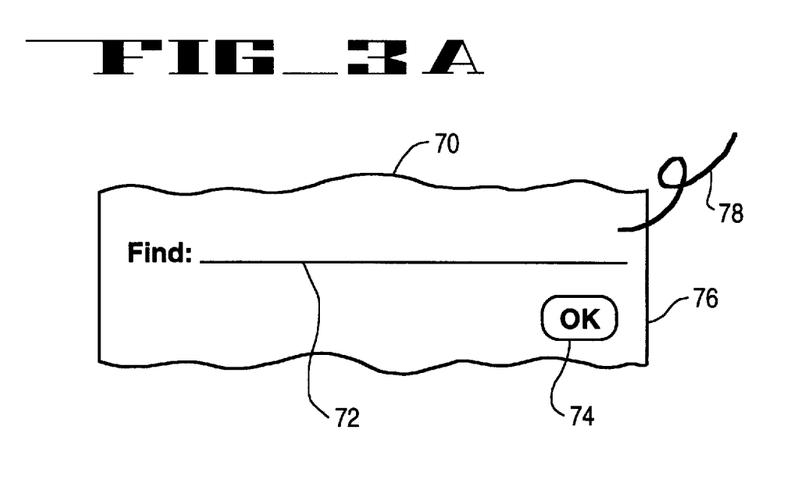
FIGS. 3a through 3d illustrate a dialog box as it is flipped over to reveal a bottom side including user selectable preferences for modifying aspects of the function of the dialog box.

Preferably, the user would perform a flip gesture 78, which would be recognized by recognition software associated with the computer system running the software program utilizing the dialog box 70 and cause the software program to commence execution of the flip operation. Typically, this flip gesture would need to conform with some predefined parameters established by the recognition software of the computer system 10, such as a location parameter which specifies that the flip gesture be entered within an area of the piece of paper to be flipped, such that the piece of paper to which the flip gesture is directed is clearly specified to the computer system. A second parameter would be a gesture parameter which specifies the type of gesture to be recognized for performing the flip operation. In the example of flip gesture 78, a line having an integral loop, like a proofreader's deletion mark, is utilized. Naturally, if the user drew the flip gesture 78 just as shown in FIG. 3a every time, the recognition software would have a relatively easy time recognizing the gesture, but since users will not always draw this line the same way, there must be some leeway built into the system for recognizing a gesture as a flip gesture even when the first part of the line is very short, or the loop is very wide, or very narrow, etc. Alternatively, the recognition software could also utilize a learning technique which would allow the user to specify their own flip gesture by having the user first teach predefined parameters for recognizing the gesture to the computer system.

Figure 3B:
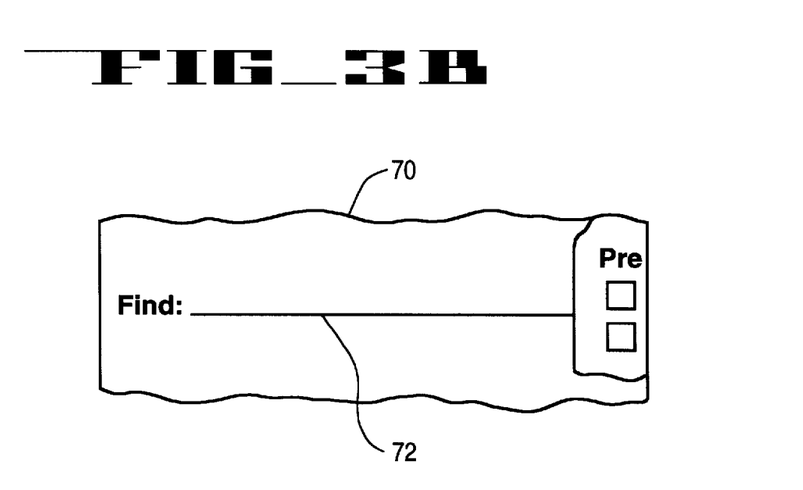
Figure 3C:
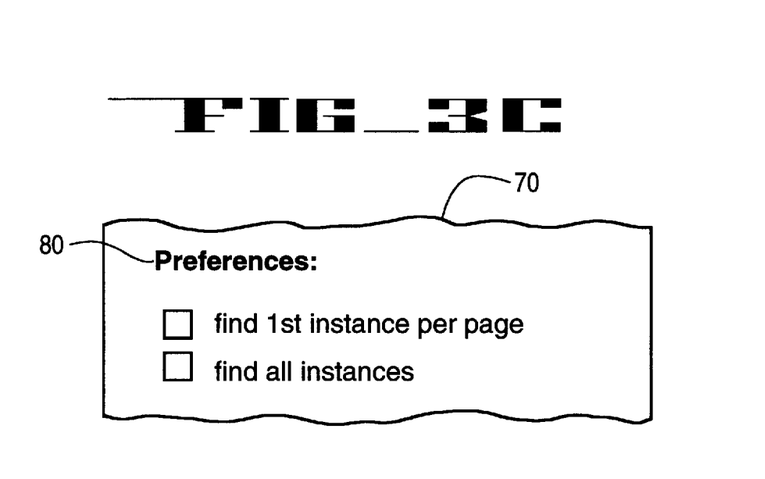
Figure 3D:
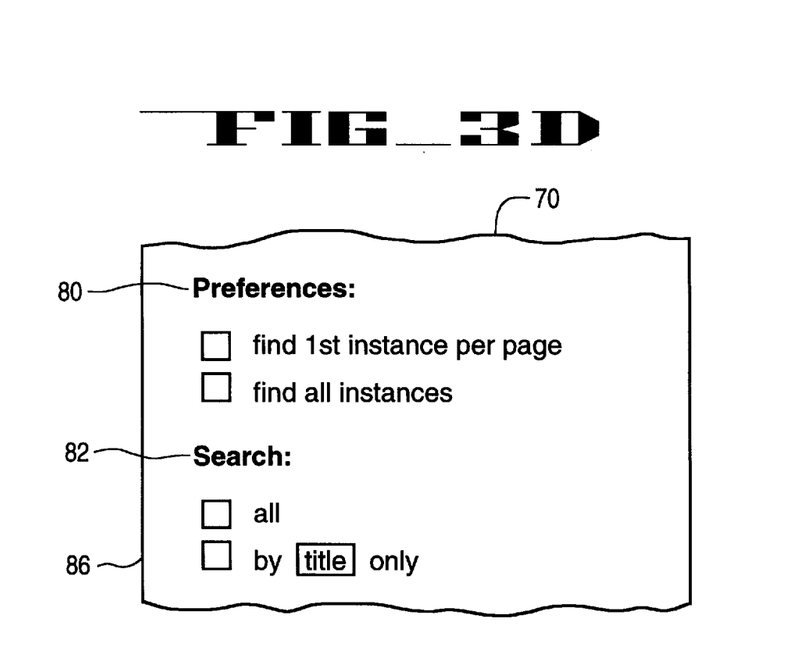

FIG. 3b further illustrates the flip operation of the dialog box 70, which in this embodiment, illustrates different portions of the bottom side of box 70 as it is being flipped. FIG. 3c illustrates the portions of information, such as preferences 80, that are available on the bottom side of box 70 when the perimeter dimensions of the top side of box 70 are utilized. Since it is possible that the bottom side of a page, dialog box, or other flippable piece of electronic paper would contain more information than would be visible within the dimensions of the top side of that paper, double-sided electronic paper is expandable once it has been flipped. This expansion feature is illustrated in FIG. 3d, in which additional search preferences 82 are made available for user selection after box 70 is flipped to its bottom side. Dialog box 70 would be flipped back over to the top side by selecting left border 86, which would cause dialog box 70 to first shrink back to the size illustrated in FIG. 3c and then flip back to the top side.

Figure 4A:
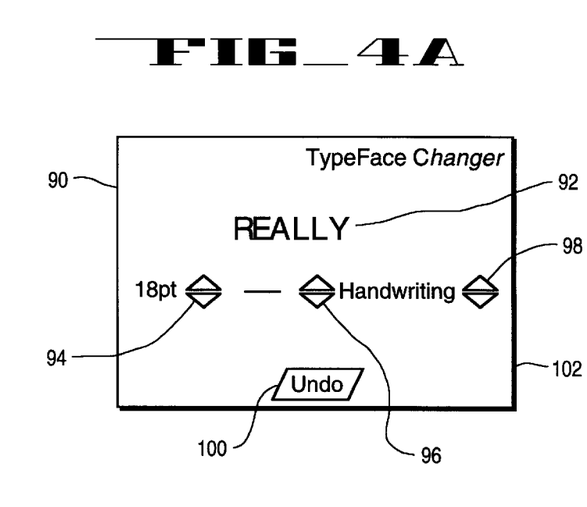
FIGS. 4a through 4c illustrate a typeface setting tool as it is flipped over to reveal a bottom side. including user selectable default preferences.
Figure 4B:
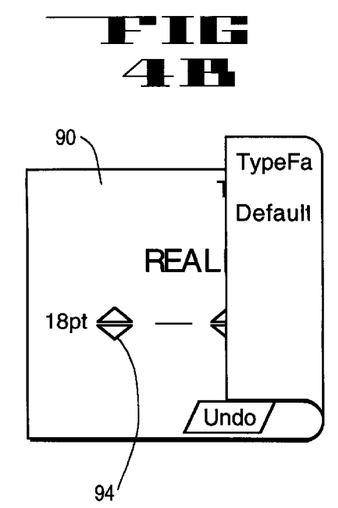
Figure 4C:
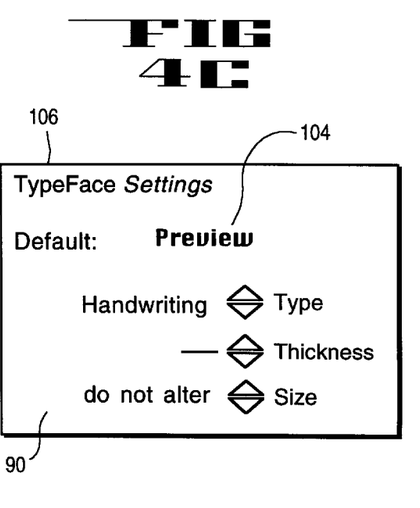

FIGS. 4a through 4c illustrate a third application of the present invention. In FIG. 4a, a piece of electronic paper in the form of a typeface changer tool 90 is illustrated, which is utilized to change the typeface of the word "really" 92. In this example, the typeface of the word 92, is changed by selecting one of the electronic button arrows corresponding to the size selector 94, style selector 96 or font selector 98. Choosing one of the arrows for size selector 94 causes the word 92 to either increase or decrease in font size. Choosing one of the arrows for style selector 96 causes the style of word 92 to either change, such as changing from plain text to bold or to outline. Choosing one of the arrows for font selector 98 causes the font for word 92 to change, such as changing from a handwriting font to the Memphis font. Selecting undo button 100 would undo any changes the user had made. Selecting the right border 102, would cause the image of the tool to flip over and reveal a bottom side, as partially illustrated in FIG. 4b. The bottom side of typeface changer tool 90, illustrated in FIG. 4c, includes settings for a default typeface, which is illustrated by the word "preview" 104. Tool 90 would be flipped back over the top side by selecting left border 106.

Figure 5:
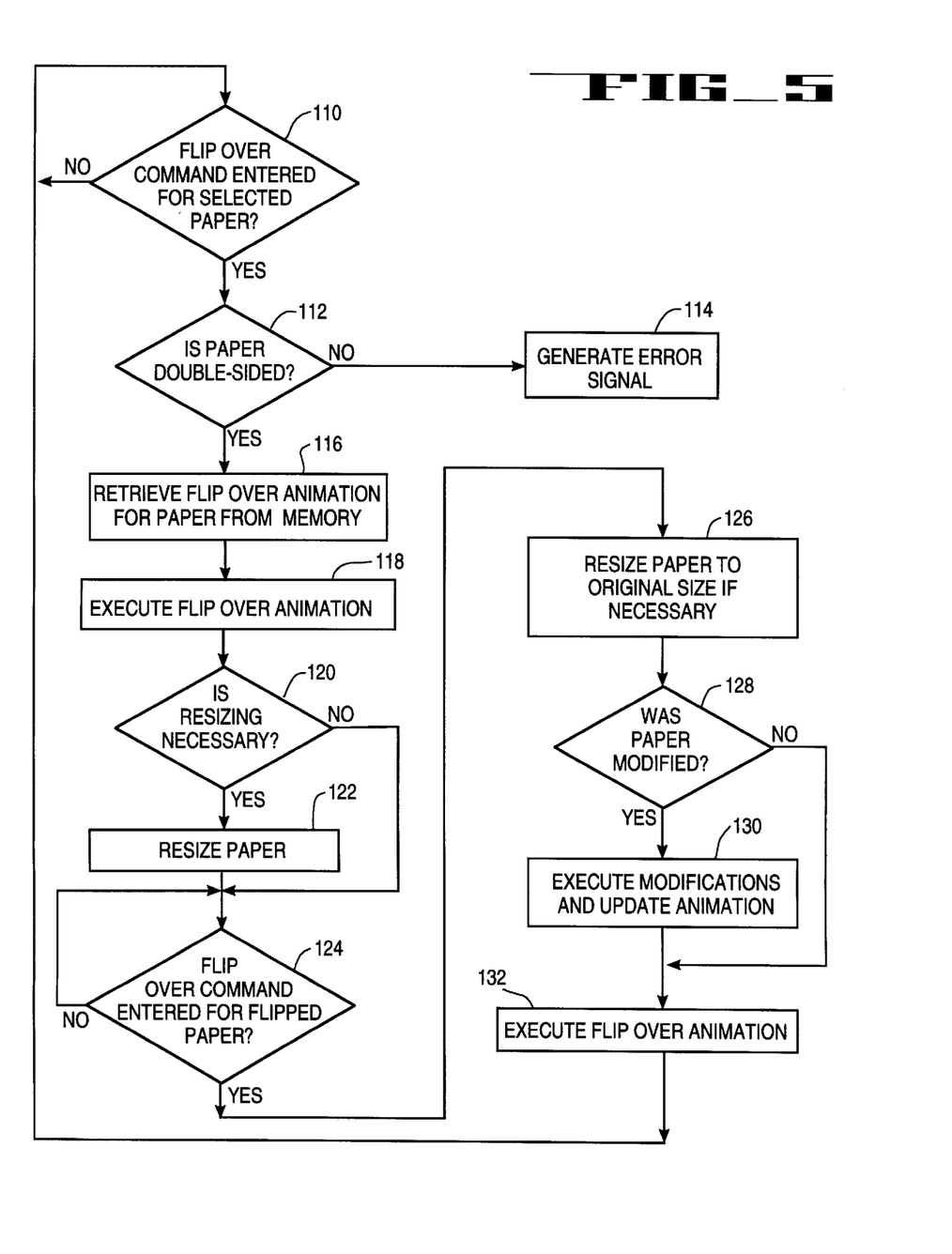
FIG. 5 is a flow chart diagram illustrating a method for flipping a graphic object having two sides in accordance with the preferred embodiment of the present invention.

With respect to any of the above-described applications of the present invention, FIG. 5 can be utilized to further illustrate the flip operation as it would be carried out by a software program written to run on computer system 10. When a flip over command is entered by a user for a selected piece of electronic paper, such as by selecting a border of a text page or performing a flip over gesture at the edge of a tool, block 110, the program would proceed to check the paper to verify that it can flipped, block 112. If a user has attempted to flip electronic paper which cannot be flipped, an error signal is generated, block 114. The error signal can be something simple, such a short beeping noise, or an error message could be generated which explains why the user has committed an error. In addition to checking to make sure the paper is double-sided, the program could also inspect the paper for flip protection at this point. For example, if a user had previously locked a piece of paper so it could not be flipped over without entering the correct password, the program would generate a dialog box requesting the password after having received the flip over command. If the user entered the correct password, the program would continue, but if the user did not know the password, the paper would be treated as though it had no bottom side.

Having determined that the selected paper could be flipped over, the flip over animation for the paper would be retrieved from memory, block 86. The flip over animation could consist of a number of stored image data representing the paper in various stages of turning from a top side view to a bottom side view. Standard flip over animation could also be used for certain standard types of documents, such as pages of various sizes, dialog boxes, etc., which include the basic animation of the page or box, but do not include the textual or graphical information with the paper being flipped. To create the final animation image, the two types of information, the basic animation and the textual or graphical information, would then be combined. Flip over animation could also be stored in the form of graphic primitives which are used to recreate the desired images in near real time. Once the flip over animation had been retrieved, in whatever form, and executed, block 118, the program would check to see if it was necessary to resize the paper to display additional necessary information, block 120, as described above with respect FIG. 3d. If it was necessary to resize the paper to display additional information, the paper would be resized, block 122, utilizing additional information retrieved from memory.

At this point, the program holds the execution of the flip operation while the user interacts with the paper. When a flip over command is again entered for the paper, this time the flipped paper, block 124, the paper is resized if necessary, block 126, and checked for any modifications that might have been entered by the user, block 128. If the user had performed some operation on the bottom side of the paper which would cause a modification of the top side of the paper, those modifications would then be executed and the stored animation information would be updated, block 130. Having updated the animation, the paper would then be flipped back over to the top side.

As can be seen from the above description, the present invention can have many different applications, only some of which are illustrated herein. One particularly useful application would be the application of the flip over operation to an electronic business card, or similar object, which could be interchanged between different computer systems at meetings or over networks. The business card could then be flipped over to reveal additional information about the holder of the card, such as a version of the information from the front side in a different language. The bottom side could also include a blank area, or be entirely blank, which could be used to write notes, like many people presently do with paper cards, but within an expandable area, which people could not do with a paper card. Thus, although the present invention has been described with reference to FIGS. 1 through 5, and with emphasis on a particular embodiment, it should be understood that the Figures are for illustration only and should not be taken as limitations upon the invention. It is also contemplated that many changes and modifications may be made by one of ordinary skill in the art to the elements, process and arrangement of steps of the process of the invention without departing from the spirit and scope of the invention as disclosed above.

I claim:

1. A computer system for displaying and manipulating a double-sided graphic image comprising:

a processor;

a display device coupled to the processor for displaying the graphic image, wherein the graphic image includes a first side and an opposing second side, wherein the first side is not a same size as the second side; and a first input device coupled to provide a flip command to the processor, wherein if the first side is displayed the graphic image is flipped such that the first side is hidden and the second side is displayed in response to the flip command, wherein if the second side is displayed the graphic image is flipped such that the second side is hidden and the first side is displayed in response to the flip command.

2. The computer system of claim 1 further comprising:

memory coupled to the processor, the memory storing:

a) graphic image data representing the first and second sides of the graphic image;

b) a display program for retrieving and displaying a selected side of the first and second sides of the graphic image from the graphic image data;

c) a flip determining program stored in the memory for determining if a flip command has been received from the input device.

3. The computer system of claim 2 wherein the flip determining program verifies whether the second side may be displayed prior to permitting a flip.

4. The computer system of claim 1 further comprising:

a memory storing:

a) animation data representing animation for flipping between the first and second sides;

b) a flip display program for displaying an animation sequence corresponding to the animation data.

5. The computer system of claim 1 wherein the first input device is a stylus.

6. The computer system of claim 1 wherein the first input device is a cursor control device.

7. The computer system of claim 1 wherein each of the first and second sides includes a graphic image of a flip selector wherein the flip command is generated when the first input device selects the flip selector.

8. The computer system of claim 1 further comprising a second input device, wherein each of the first and second sides includes a graphic image of a flip selector, wherein the flip command is generated when a cursor is over the graphic image of the flip selector and a select signal is generated from one of the first and second input devices.

9. The computer system of claim 1 wherein the flip command is generated when a graphic gesture is made within a prescribed area of the display device using the first input device.

10. A method for displaying a double-sided graphic image on a display device of a computer system, comprising the steps of:

a) displaying a first side of the graphic image on the display device; and b) flipping the graphic image to display an opposing second side of the graphic image in response to a flip command, wherein the first side is hidden when the second side is displayed, wherein the first side is not a same size as the second side.

11. The method of claim 10 wherein the computer system includes a memory, and wherein the flipping step includes the steps of:

a) verifying that the graphic image may be flipped;

b) retrieving at least one transition view of the graphic image from the memory, wherein the transition view includes at least a portion of the second side;

c) displaying the transition view on the display device; and d) displaying the second side.

12. The method of claim 11 wherein the verifying step includes verifying that a user is permitted to view the second side of the graphic image.

13. The method of claim 10 wherein the displaying step includes the step of displaying the first side in a first area of the display device and wherein the flipping step includes the step of displaying the second side in a second area of the display device wherein the second area is substantially within the first area of the display device.

14. The method of claim 13 including the step of expanding the second area to be larger than the first area if displaying the second side requires more display space than available within the first area.

15. The method of claim 10 wherein each side contains graphic information related to the opposing side, further comprising the steps of:

a) modifying the graphic information of the first side in response to changes made in the related graphic information of the second side; and b) modifying the graphic information of the second side in response to changes made in the related graphic information of the first side.

16. A method for displaying a double-sided graphic image on a display device of a computer system, comprising the steps of:

a) recognizing a user-defined action for flipping the graphic image, the user-defined action entered by a user as a graphic gesture on the display device, wherein a first side of the graphic image is being displayed;

b) flipping the graphic image and displaying an opposing second side if the user-defined action is recognized by the computer system, wherein the first and second sides are not a same size.

17. The method of claim 16 wherein the graphic gesture is recognized only if entered by the user within a limited area of the display device.

18. The method of claim 17 wherein the limited area includes first area of the display device occupied by the graphic image and a second area of the display device forming a border extending from the first area.

19. The method of claim 17 wherein the graphic gesture is a line having an integral loop.

20. The method of claim 19 wherein the line having an integral loop appears similar to a proofreader's deletion mark.

21. The method of claim 16 wherein the graphic gesture complies with a set of pre-defined parameters including a location parameter and a gesture parameter, the gesture parameter specifying the type of gesture to be recognized.

22. The method of claim 21 wherein at least one of the pre-defined parameters is defined by the user.

* * * * *